United States Patent
Lee et al.

(10) Patent No.: US 7,777,830 B2
(45) Date of Patent: Aug. 17, 2010

(54) BACKLIGHT UNIT AND LIQUID CRYSTAL DISPLAY MODULE USING THE SAME

(75) Inventors: Min-Gyu Lee, Gumi-si (KR); Kyoung-Sub Kim, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 236 days.

(21) Appl. No.: 11/638,209

(22) Filed: Dec. 13, 2006

(65) Prior Publication Data
US 2007/0291512 A1 Dec. 20, 2007

(30) Foreign Application Priority Data
Jun. 16, 2006 (KR) .................. 10-2006-0054554

(51) Int. Cl.
*G02F 1/1333* (2006.01)
*G02F 1/1335* (2006.01)

(52) U.S. Cl. ..................... 349/62; 349/58; 349/61; 349/68; 349/69; 349/70

(58) Field of Classification Search ............. 349/61–71, 349/58
See application file for complete search history.

(56) References Cited

U.S. PATENT DOCUMENTS

| 5,143,433 | A  | * | 9/1992  | Farrell ........................ 362/29 |
| 5,760,754 | A  | * | 6/1998  | Amero et al. .................. 345/82 |
| 6,206,534 | B1 | * | 3/2001  | Jenkins et al. ............. 362/600 |
| 2002/0024623 | A1 | * | 2/2002 | Kim et al. .................... 349/58 |
| 2004/0155994 | A1 | * | 8/2004 | Saito et al. ................... 349/61 |
| 2006/0221641 | A1 | * | 10/2006 | Yoon et al. .................. 362/623 |

* cited by examiner

*Primary Examiner*—David Nelms
*Assistant Examiner*—Jessica M Merlin
(74) *Attorney, Agent, or Firm*—Brinks Hofer Gilson & Lione (57) ABSTRACT

A backlight unit includes a lamp, a bottom frame disposed under the lamp, the bottom frame having a first hole corresponding to the lamp, a light guide holder inserted into the first hole, and a light emitting diode disposed under the light guide holder.

15 Claims, 7 Drawing Sheets

BACKLIGHT UNIT AND LIQUID CRYSTAL DISPLAY MODULE USING THE SAME

This application claims the benefit of Korean Patent Application No. 10-2006-054554, filed on Jun. 16, 2006, which is hereby incorporated by reference for all purposes as if set forth herein.

BACKGROUND

The present disclosure relates to a display device, and more particularly, to a backlight unit and a liquid crystal display (LCD) module using the same that can improve a display quality.

DISCUSSION OF THE RELATED ART

Flat panel display (FPD) devices that are portable and consume small amounts of power have been the subject of recent research. Among the various types of FPD devices, liquid crystal display (LCD) devices are widely used as monitors for notebook computers and desktop computers because of their high resolution, ability to display colors, and superiority in displaying moving images.

In general, an LCD device includes a first substrate, a second substrate, and a liquid crystal layer between the first and second substrates. The LCD device uses the optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field. Thus, by properly controlling the electric field applied to a group of liquid crystal molecules within respective pixel regions, a desired image can be produced by appropriately modulating the transmittance of the incident light.

In particular, an active matrix type LCD device using a thin film transistor as a switching element is suitable for displaying a dynamic image.

Figure 1:
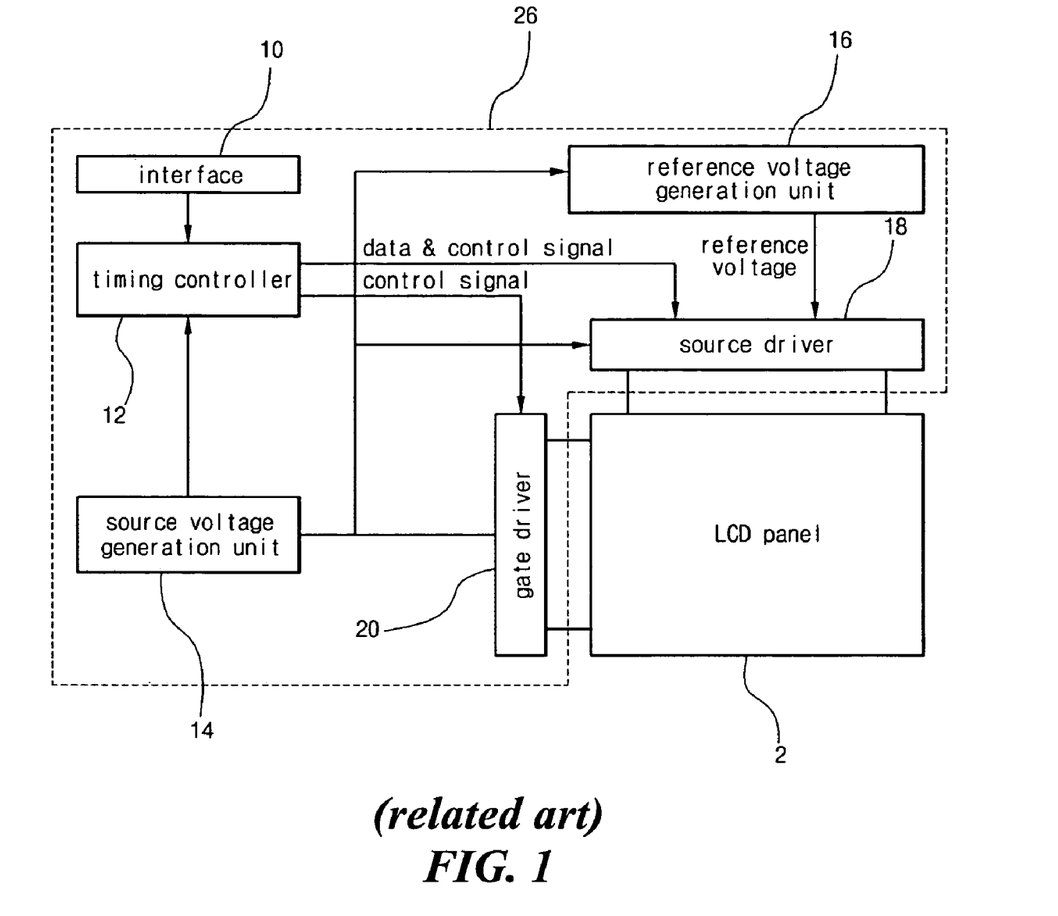
FIG. 1 is a schematic view showing a liquid crystal display (LCD) device having an LCD panel and a driving circuit unit according to the related art.
Figure 2:
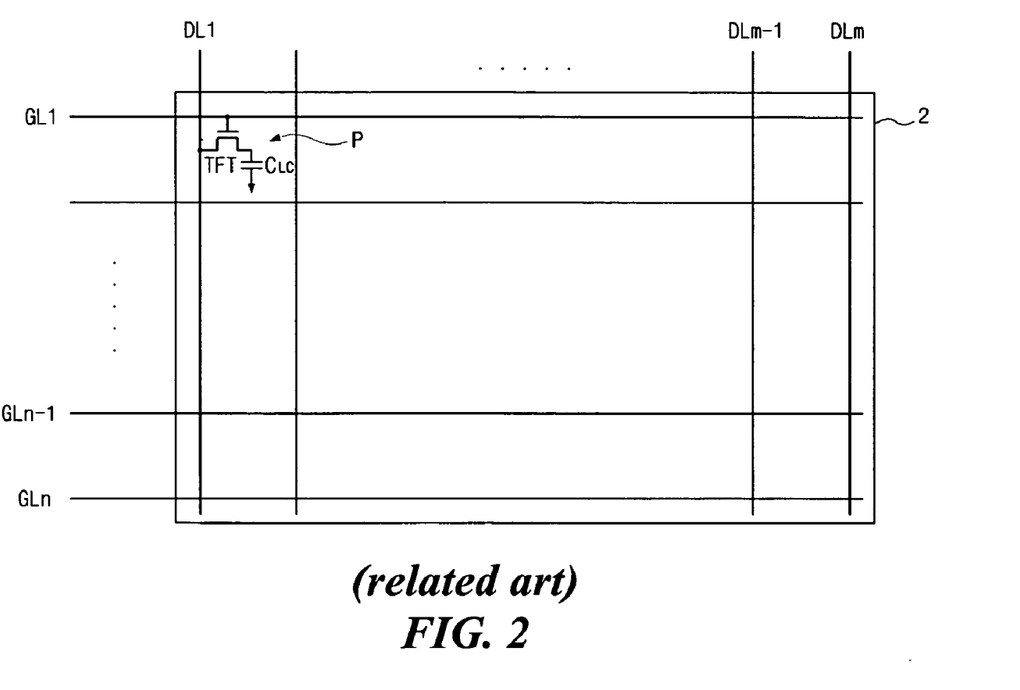
FIG. 2 is a schematic view showing the LCD panel of FIG. 1.

FIG. 1 is a schematic view showing a liquid crystal display (LCD) device having an LCD panel and a driving circuit unit according to the related art. FIG. 2 is a schematic view showing the LCD panel of FIG. 1.

In FIG. 1, a LCD device includes a LCD panel 2 and a driving circuit unit 26. Specifically, an interface 10 is provide to a timing controller 12 by receiving red (R), a green (G) and blue (B) data, a control signal such as an input clock, a horizontal synchronizing signal, a vertical synchronizing signal, a data enable signal or the like inputted from a driving system such as a personal computer to the driving circuit unit 26.

Mainly, a low voltage differential signal (LVDS) interface, a time to live (TTL) interface or the like is utilized in order to transmit data and control signals from the driving system. Further, the interface 10 and the timing controller 12 may be utilized by accumulating them on a single chip.

In FIG. 2, a LCD panel 2 includes a first substrate (not shown), a plurality of gate lines "GL1-GLn" on the first substrate, a plurality of data lines "DL1-DLm" defining a plurality of pixel regions "P" by crossing the plurality of gate lines "GL1-GLn," a thin film transistor "TFT" at crossing one of plurality of gate lines "GL1-GLn" and one of the plurality of data lines "DL1-DLm," and a pixel electrode (not shown) connected to the thin film transistor "TFT." Although not shown, a second substrate faces the first substrate and has a color filter and a common electrode. Further, a liquid crystal layer may be interposed between the first and second substrates. The liquid crystal layer is driven by a vertical electric field between the pixel electrode and the common electrode, thereby displaying an image.

The timing controller 12 generates a control signal for driving a gate driver 20 and a source driver 18 using the control signal inputted through the interface 10. Here, the gate driver 20 includes a plurality of gate driver ICs (not shown) and the source driver 18 includes a plurality of source driver ICs (not shown). Further, the inputted data through the interface 10 is transmitted to the source driver 18.

A reference voltage generation unit 16 generates a reference voltage of a digital to analog converter (DAC) utilized in the source driver 18. The reference voltage is determined by a producer with respect to a transmittance-voltage (T-V) property of the LCD panel 2. The source driver 18 selects the reference voltage of the inputted data by responding to the inputted control signals from the timing controller 12, and a rotation angle of the liquid crystal molecule is controlled by providing the selected reference voltage to the LCD panel 2.

The gate driver 20 performs an ON/OFF control of the thin film transistors "TFT" arranged on the LCD panel 2 by responding to the control signals inputted from the timing controller 12. Here, by sequentially enabling the gate lines "GL1-GLn" by the required time for one horizontal synchronizing, the thin film transistors "TFT" are sequentially driven by one line so that analog signals provided from the source driver 18 could be applied to the pixel electrodes to the thin film transistors "TFT."

Generally, the source driver 18 and the gate driver 20 include a plurality of chips, respectively. The source voltage generation unit 14 provides the LCD panel 2 with voltage to operate the respective elements with the LCD panel. Further, the source voltage generation unit 14 generates and provides the LCD panel 2 with a voltage of a common electrode of the LCD panel 2.

Furthermore, although not shown, a backlight unit is disposed under the LCD panel 2 as light source. In particular, the backlight unit is classified into a side type and a direct type in accordance with a disposition of a lamp of the backlight unit.

Specifically, a direct type backlight unit includes a plurality of lamps arranged in parallel to each other. On the other hand, a side type backlight unit includes a lamp disposed at a side of a light guide plate of the backlight unit. That is, the direct type backlight unit is generally applied to a large size type LCD device that requires a larger amount of light from the light source. The direct type backlight unit further includes a reflective sheet for preventing a light loss by reflecting any radiated light toward the LCD panel, and a light diffusion means, which may include a diffusion plate and an optical sheet, radiates a uniform light by diffusing light. However, the light guide plate, which changes line light into planar light, may be unnecessary in the direct type backlight unit.

Figure 3:
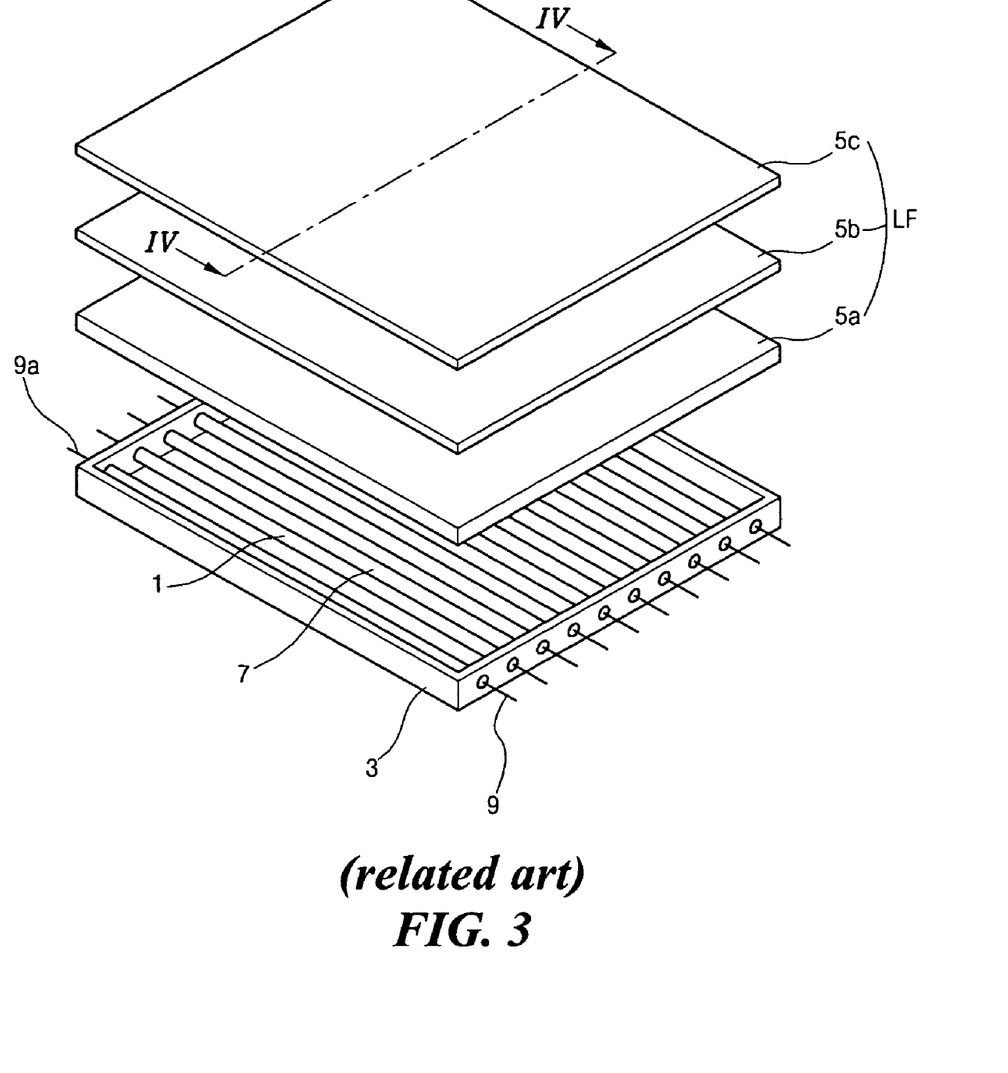
FIG. 3 is an exploded perspective view of a direct type backlight unit according to the related art.

FIG. 3 is an exploded perspective view of a direct type backlight unit according to the related art.

In FIG. 3, a direct type backlight unit includes a plurality of lamps 1, a bottom frame 3 fixing and supporting the lamps 1, and a light diffusion means "LF" between the lamps 1 and an LCD panel (not shown). Here, the light diffusion means "LF" prevents observing the shape of the lamps 1 from outside the LCD panel and also provides a light source having a uniform brightness. In order to increase light diffusion effect, the light diffusion means "LF" sequentially includes a diffusion plate 5a and optical sheets 5b and 5c.

Further, a reflective sheet 7 is disposed on the bottom frame 3 so that light generated by the lamp 1 and directed toward the bottom frame 3 is intensively irradiated toward a display region of the LCD panel. In other words, the reflective sheet 7 is utilized to maximize light utility efficiency. For example, the lamp 1 is a cold cathode fluorescent lamp (CCFL) with electrodes that are disposed at both end portions of a glass tube of the lamp 1. The lamp 1 generates and radiates light from electric power supplied to the electrodes. The lamps 1 is inserted into grooves (not shown) of both end portions of the bottom frame 3.

Figure 4:
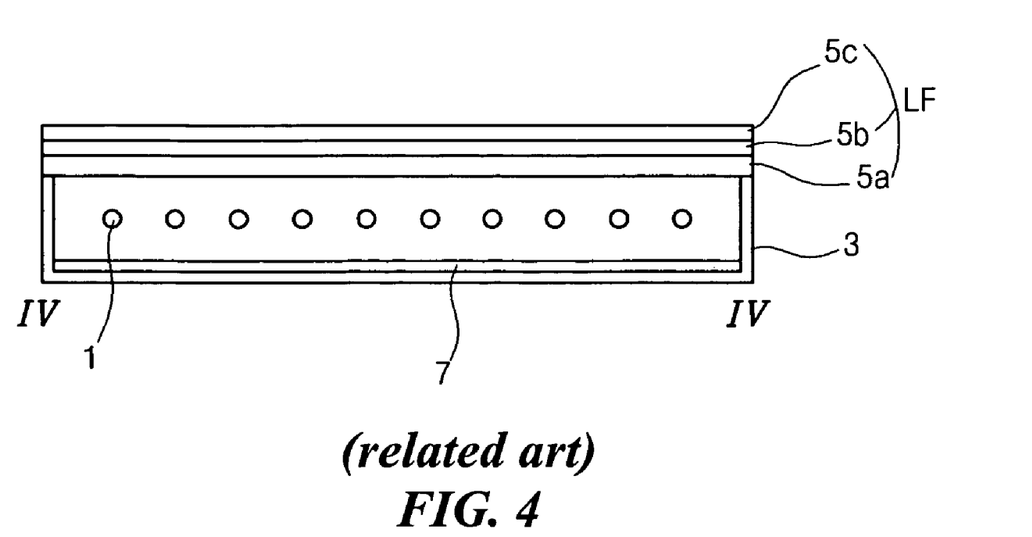
FIG. 4 is a schematic cross-sectional view taken along a line "IV-IV" of FIG. 3.

FIG. 4 is a schematic cross-sectional view taken along a line "IV-IV" of FIG. 3.

In FIG. 4, the lamps 1 are arranged in parallel to each other, and the bottom frame 3 retaining the lamps 1 so that the lamps 1 are disposed on an inner surface of the bottom frame 3, and the light diffusion means "LF" are provided with respect to the lamps 1 to contact a top surface of the bottom frame 3. When the lamps 1 are maintained the black state (i.e. deenergized) for a long time, the lamps 1 are not lighted at once or immediately when the electric power is supplied to the lamps 1 because gas charged within the lamps 1 is initially and remains in the ground state although the electric power is being supplied to the lamp. Therefore, since image is immediately displayed by the LCD panel, the image is not immediately observable on the display.

BRIEF SUMMARY

Additional features and advantages will be set forth in the description which follows, and in part will be apparent from the description, or may be learned by practice of the disclosure. The objectives and other advantages will be realized and attained by the structure particularly pointed out in the written description and claims hereof as well as the appended drawings.

A first representative embodiment of the invention includes a lamp, a bottom frame disposed under the lamp, the bottom frame having at least one first hole corresponding to the at least one lamp, at least one light guide holder inserted into a first hole, and a light emitting diode disposed under the light guide holder.

Another representative embodiment of the invention includes a liquid crystal display module with a liquid crystal panel, a backlight unit including a lamp, a bottom frame disposed under the lamp, the bottom frame having at a hole corresponding to the lamp, a light guide holder inserted into the hole, and a light emitting diode disposed under the light guide holder, a main frame surrounding a side edge of the liquid crystal panel and the backlight unit, and a top frame surrounding a front edge of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 5:
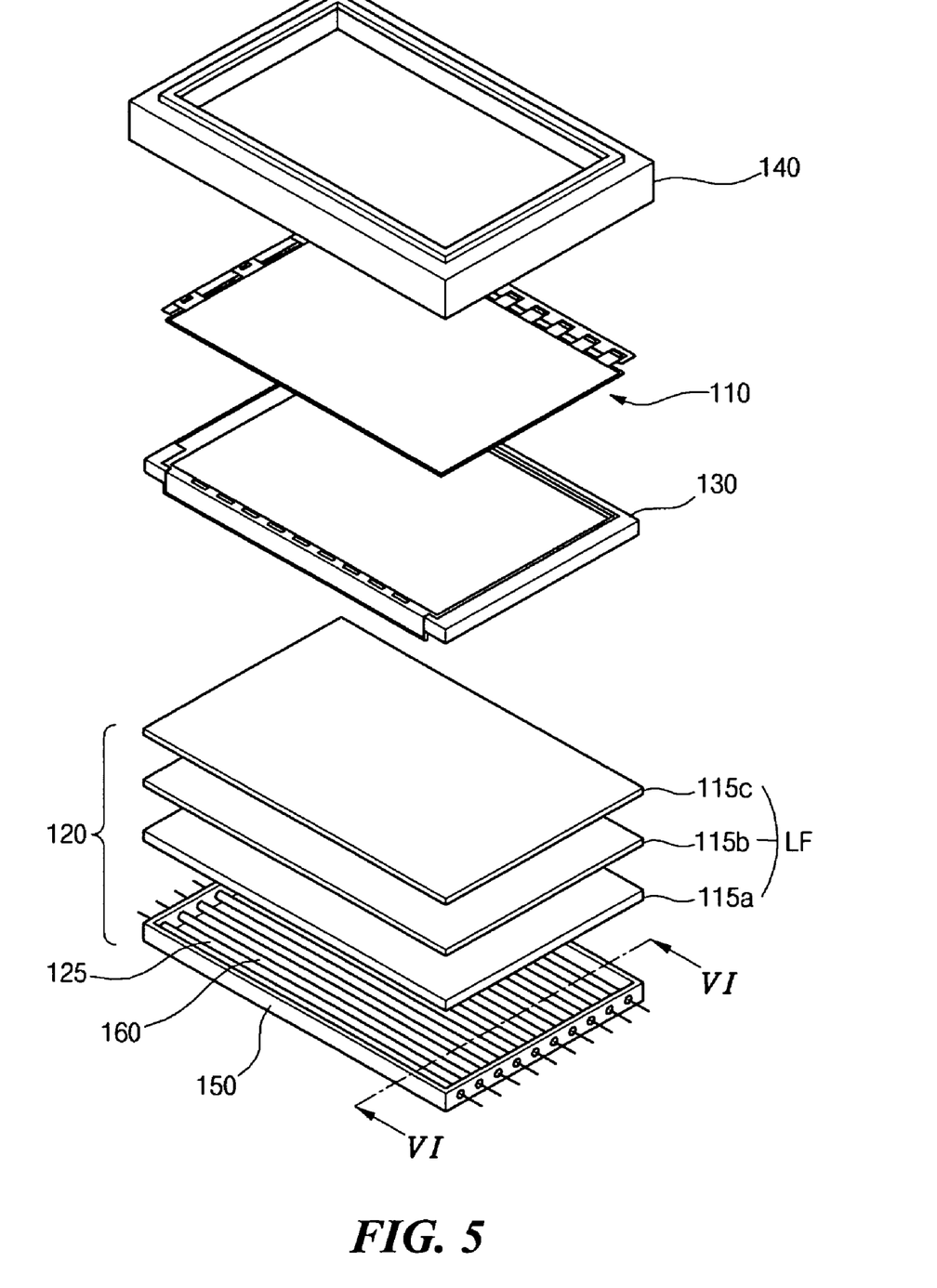
FIG. 5 is an exploded perspective view of an LCD module including a direct type backlight unit according to an embodiment of the present invention.

As shown in FIG. 5, a LCD module includes an LCD panel 110, a direct type backlight unit 120, a main frame 130 surrounding the edges of the LCD panel 110 and the direct type backlight unit 120, and a top frame 140 surrounding a front edge of the LCD panel 110.

The direct type backlight unit 120 includes a plurality of lamps 160 arranged to be parallel to each other, a bottom frame 150 fixing and supporting the lamps 160, and a light diffusion means "LF" between the lamps 160 and the LCD panel 110. Here, substantially, the top frame 140 and the bottom frame 150 are combined with the main frame 130. The light diffusion means "LF" prevents showing a shape of the lamps 160 to a display surface to the LCD panel 110 and provides a light source having a wholly uniform brightness. For example, the light diffusion means "LF" includes a diffusion plate 115a and optical sheets 115b and 115c.

Further, a reflective sheet 125 is disposed on the bottom frame 150 so that light generated from the lamp 160 toward the bottom frame 150 is intensively irradiated toward the display region of the LCD panel 110. In other words, the reflective sheet 125 is necessary to maximize light utility efficiency. For example, the lamp 160 includes a CCFL.

Figure 6:
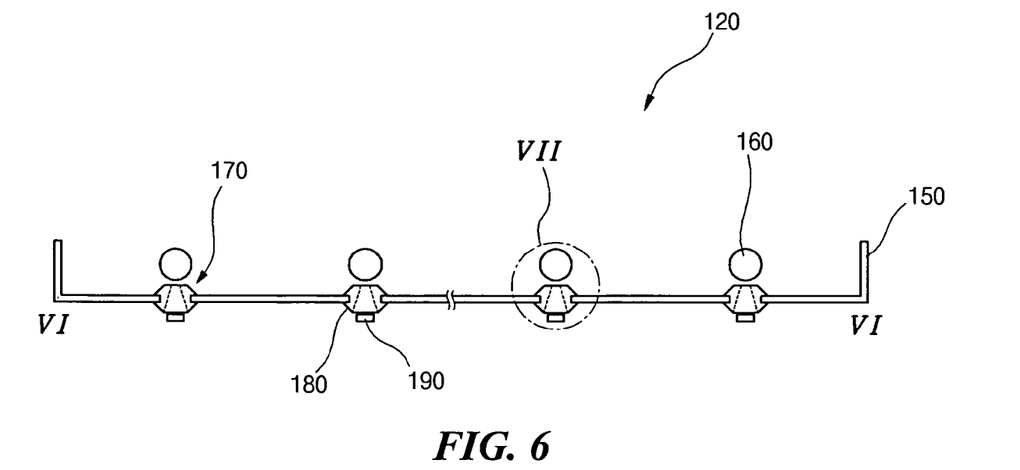
FIG. 6 is a schematic cross-sectional view taken along a line "VI-VI" of FIG. 5.

As shown in FIG. 6, the backlight unit 120 includes the lamps 160 in an inner surface of the bottom frame 150 and a plurality of holes 170 in the bottom frame 150. Here, respective holes 170 correspond to each lamp 160. Further, a light guide holder 180 is inserted into each of the holes 170 and a light emitting diode 190 is disposed under the light guide holder 180.

For example, one of the holes 170 is disposed under one of the lamp 160, and more particularly, the one of the holes 170 is disposed at a central position of the lamp 160 along a lengthwise direction of the lamp 160. Further, the bottom frame 150 may be made of a metallic material that includes favorable durability and heat-resistance properties.

The lamp 160 generates and radiates light toward the LCD panel 110 (of FIG. 5) when the electric power is supplied to the lamp 160. The light guide holder 180 is inserted into the hole 170 formed in the bottom frame 150 and acts as concentrating light from the light emitting diode 190 toward the lamp 160. Although not shown, when the reflective sheet 125 (of FIG. 5) is disposed on an inner surface of the bottom frame 150, the reflective sheet 125 should have a plurality of second holes (not shown) corresponding to the holes 170.

Figure 7:
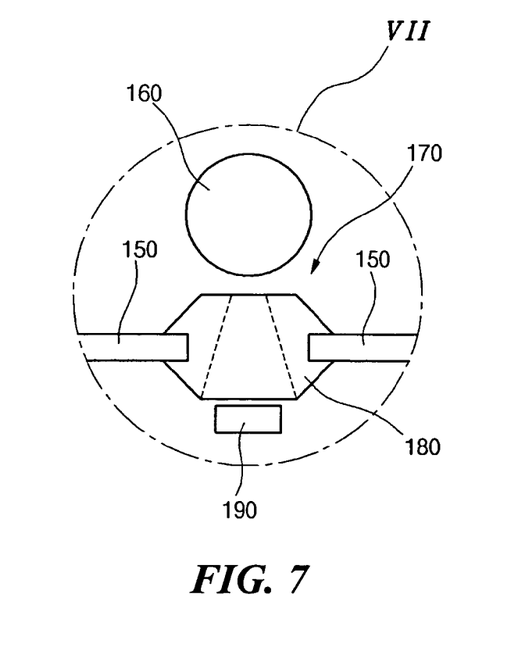
FIG. 7 is an expanded view of a region "VII" of FIG. 6.
Figure 8A:
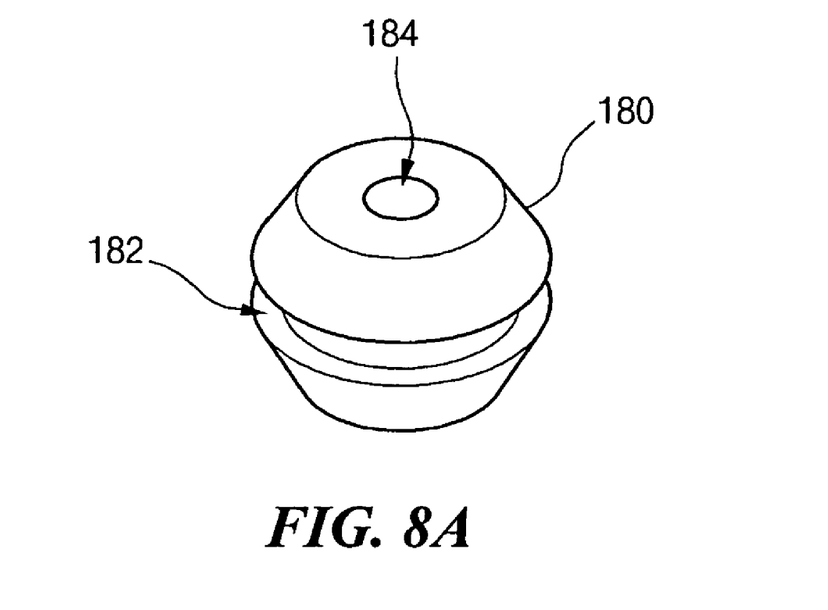
FIG. 8A is a perspective view of a light holder of the backlight unit of FIG. 5.
Figure 8B:
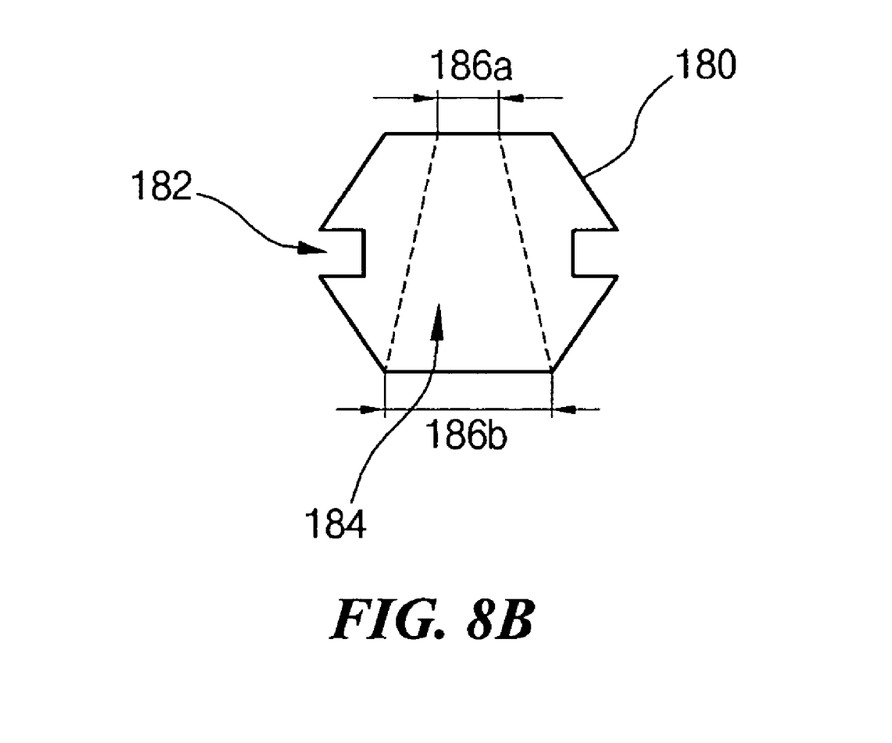
FIG. 8B is a cross-sectional view of the light guide holder of FIG. 8A.

As best shown in FIGS. 7, 8A and 8B, the light guide holder 180 may have a cylindrical shape having a through hole 184 therein. The light guide holder 180 has a groove 182 to be inserted into the hole 170. The light guide holder 180 includes a flexible material capable of being effectively inserted into the hole 170 of the bottom frame 150. For example, the flexible material includes one of silicon (Si), plastics and the like.

The through hole 184 of the light guide holder 180 has a first diameter 186a adjacent to the lamp 160 and a second diameter 186b adjacent to the light emitting diode 190. As best shown in FIG. 8B, the first diameter 186a is smaller than the second diameter 186b so that light from the light emitting diode 190 is concentrated as it moves toward the lamp 160. Further, the first diameter 186a may be smaller than a diameter of tube of the lamp 160, and the second diameter 186b may be larger than a length of a longitudinal axis of the light emitting diode 190. For example, the light guide holder 180 is formed with a reflective material on its external surface or has a white external surface to increase the concentration effect of the light from the light emitting diode 190 on the lamp 160.

The light emitting diode 190 may emit various colors of light such as white, yellow, blue or the like. In particular, the light emitting diode 190 provides the lamp 160 with light in order to increase activity of gas charged in the lamp 160 before the electric power is supplied to the lamp 160. That is, when the electric power is supplied to the lamp 160, the light emitted from the light emitting diode 190 helps to rapidly start the lamp 160. Alternatively, a circuit unit (not shown) including the light emitting diode 190 may be disposed under the bottom frame 150. Further, one of the light guide holders 180 and one of the light emitting diodes 190 are disposed under the one of the lamps 160 and at a central position of the lamp 160 along a lengthwise direction of the lamp 160. That is, light from the light emitting diode 190 is provided and concentrated toward the lamp 160 with aid from the light guide holder 180.

In other words, the lamp 160 is black (i.e. not illuminated) before the LCD device is driven. Next, light enters the lamp 160 from the light emitting diode 190 that is concentrated as it travels through the through hole 184 of the light guide holder 180. With the receipt of light from the light emitting diode 190, the activity of the gas within the lamp 160 is increased due to the energy from the light incident from the light emitting diode 190. Therefore, when the lamp 160 is driven by the supplied electric power, the lamp 160 may be rapidly turned on without a significant time delay because the charged gas within the lamp 160 is already activated. Consequently, the image quality of the LCD panel is improved due to the fast illumination of the lamp 160 due to the receipt of incident light from the light emitting diode 190 during startup.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
a lamp;
a bottom frame disposed under the lamp, the bottom frame having a first hole corresponding to the lamp;
a light guide holder for concentrating light from a light emitting diode toward the lamp, the light guide holder inserted into the first hole; and
the light emitting diode disposed under the light guide holder,
wherein the light guide holder has a second hole, and wherein a first portion of the second hole of the light guide holder has a first diameter, and a second portion of the second hole of the light guide holder has a second diameter smaller than the first diameter, wherein the first portion is closer to the light emitting diode than the second portion,
wherein the light guide holder includes a groove at a side of the light guide holder, and the bottom frame is inserted into the groove.

2. The backlight unit according to claim 1, wherein the lamp is a fluorescent lamp that includes a fluorescent substance and a mixed gas having an inert gas and mercury (Hg).

3. The backlight unit according to claim 1, wherein the first diameter is less than a tube diameter of the lamp.

4. The backlight unit according to claim 1, wherein the second diameter is larger than a length of a long axis of the light emitting diode.

5. The backlight unit according to claim 1, wherein the lamp, the light guide holder, and the light emitting diode each comprise a plurality of lamps, a plurality of light guide holders, and a plurality of light emitting diodes, respectively, and wherein one of the plurality of light guide holders and one of the light emitting diodes are disposed with respect to one of the plurality of lamps.

6. The backlight unit according to claim 5, wherein the light guide holder and the light emitting diode are disposed at a central position of the lamp along a lengthwise direction of the lamp.

7. The backlight unit according to claim 1, wherein the external surface of the light guide holder is white.

8. The backlight unit according to claim 1, wherein the light guide holder is formed from a synthetic resin with heat resistance.

9. The backlight unit according to claim 1, further comprising an optical sheet on a substantially opposite side of the lamp from the bottom frame.

10. The backlight unit according to claim 1, further comprising a reflective sheet between the lamp and the bottom frame.

11. The backlight unit according to claim 10, wherein the reflective sheet has at least one second hole corresponding to the first hole.

12. The backlight unit according to claim 1, wherein the light emitting diode provides the lamp with light through the light guide holder before a power is provided to the lamp.

13. The backlight unit according to claim 1, wherein the light guide holder has a cylindrical shape.

14. The backlight unit according to claim 1, wherein the lamp comprises a plurality of lamps that are arranged to be parallel to each other.

15. A liquid crystal display module, comprising:
a liquid crystal panel;
a backlight unit comprising:
a lamp;
a bottom frame disposed under the lamp, the bottom frame having a hole corresponding to the lamp;
a light guide holder for concentrating light from a light emitting diode toward the lamp, the light guide holder inserted into the hole; and
the light emitting diode disposed under the light guide holder;

a main frame surrounding a side edge of the liquid crystal panel and the backlight unit; and a top frame surrounding a front edge of the liquid crystal panel, wherein the light guide holder has a second hole, and wherein a first portion of the second hole of the light guide holder has a first diameter, and a second portion of the second hole of the light guide holder has a second diameter smaller than the first diameter, wherein the first portion is closer to the light emitting diode than the second portion, wherein the light guide holder includes a groove at a side of the light guide holder, and the bottom frame is inserted into the groove.

* * * * *